(12) United States Patent
Shimogori et al.

(10) Patent No.: US 11,163,812 B2
(45) Date of Patent: Nov. 2, 2021

(54) CLASSIFICATION APPARATUS AND CLASSIFICATION METHOD

(71) Applicant: Kabushiki Kaisha Toshiba, Minato-ku (JP)

(72) Inventors: Yumiko Shimogori, Kawasaki (JP); Hisayoshi Nagae, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 1104 days.

(21) Appl. No.: 15/433,149

(22) Filed: Feb. 15, 2017

(65) Prior Publication Data

US 2017/0161374 A1    Jun. 8, 2017

Related U.S. Application Data

(63) Continuation of application No. PCT/JP2015/058324, filed on Mar. 19, 2015.

(51) Int. Cl.
*G06F 7/00* (2006.01)
*G06F 16/35* (2019.01)
(Continued)

(52) U.S. Cl.
CPC ............. *G06F 16/35* (2019.01); *G06F 16/00* (2019.01); *G06F 16/334* (2019.01);
(Continued)

(58) Field of Classification Search
CPC ........ G06F 16/35; G06F 16/334; G06F 16/00; G06F 40/35; G06F 40/268; G06F 40/242;
(Continued)

(56) References Cited

U.S. PATENT DOCUMENTS

| 7,412,036 B1 * | 8/2008 | Charpentier ........ H04M 3/4931 |
| | | 379/218.02 |
| 2003/0041058 A1 | 2/2003 | Ibuki et al. |

(Continued)

FOREIGN PATENT DOCUMENTS

| JP | 2-238567 | 9/1990 |
| JP | 2001-229200 | 8/2001 |

(Continued)

OTHER PUBLICATIONS

Office Action dated Jun. 6, 2017 in Japanese in Patent Application No. 2017-505993.

(Continued)

*Primary Examiner* — Azam M Cheema
(74) *Attorney, Agent, or Firm* — Oblon, McClelland, Maier & Neustadt, L.L.P.

(57) ABSTRACT

According to one embodiment, a classification apparatus includes the following elements. The target log extraction unit extracts a set of dialogue logs for a dialogue from dialogue logs for dialogues between a user and an interactive system, the dialogue including a first speech and a second speech of the user, the set of dialogue logs including information indicative of a classification used for a search performed by the interactive system based on the first speech, information indicative of a failure in the first search, and data acquired as a result of a search performed by the interactive system based on the second speech. The classification relation generator generates a classification relation in which the classification is associated with the data.

9 Claims, 10 Drawing Sheets

(51) Int. Cl.
  *G06F 16/33* (2019.01)
  *G06F 16/00* (2019.01)
  *G06F 40/30* (2020.01)
  *G06F 40/35* (2020.01)
  *G06F 40/242* (2020.01)
  *G06F 40/268* (2020.01)
  *G10L 15/18* (2013.01)
  *G10L 15/22* (2006.01)

(52) U.S. Cl.
  CPC .......... *G06F 40/242* (2020.01); *G06F 40/268* (2020.01); *G06F 40/30* (2020.01); *G06F 40/35* (2020.01); *G10L 15/18* (2013.01); *G10L 15/22* (2013.01); *G10L 15/1822* (2013.01)

(58) Field of Classification Search
  CPC ......... G06F 40/30; G10L 15/18; G10L 15/22; G10L 15/1822
  See application file for complete search history.

(56) References Cited

U.S. PATENT DOCUMENTS

| | | | |
|---|---|---|---|
| 2005/0171779 A1* | 8/2005 | Joublin | G10L 15/1822 704/270.1 |
| 2006/0074902 A1 | 4/2006 | Anderson et al. | |
| 2007/0094008 A1 | 4/2007 | Huang et al. | |
| 2008/0215320 A1* | 9/2008 | Wu | G10L 2015/228 704/231 |
| 2009/0216756 A1* | 8/2009 | Arao | G06F 16/954 |
| 2011/0314005 A1 | 12/2011 | Guo | |

FOREIGN PATENT DOCUMENTS

| | | |
|---|---|---|
| JP | 2002-288201 | 10/2002 |
| JP | 2004-334638 | 11/2004 |
| JP | 2006-107467 | 4/2006 |
| JP | 2006-277676 | 10/2006 |
| JP | 2007-115143 | 5/2007 |
| JP | 2008-97082 | 4/2008 |
| JP | 2011-86032 | 4/2011 |
| JP | 2011-215723 | 10/2011 |
| JP | 2013-528881 A | 7/2013 |

OTHER PUBLICATIONS

International Search Report dated Jun. 16, 2015 in PCT/JP2015/058324, filed on Mar. 19, 2015 ( with English translation).
Written Opinion dated Jun. 16, 2015 in PCT/JP2015/058324, filed on Mar. 19, 2015.

* cited by examiner

| ID | Input | Output | Intention | Argument |
|---|---|---|---|---|
| 1 | "dialogue": {<br>　"text": "I want to watch a program of a genre of suspense drama."<br>　"screen":"OA"<br>} | "command": {<br>　"action": "program.search",<br>　"args": {<br>　　"genre": "Suspense drama"<br>　}<br>} | Search | Genre: suspense drama |
| 2 | "result": {<br>　"args": {<br>　　"hit": "0"<br>　},<br>　"status": "ok"<br>} | "tts": {<br>　"text": "No program has been found."<br>} | Search result | Number of hits: 0 |
| 3 | "dialogue": {<br>　"text": "Eh? I said, "Drama"."<br>　"screen":"OA"<br>} | "command": {<br>　"action": "program.search",<br>　"args": {<br>　　"genre": "Drama"<br>　}<br>} | Paraphrase Search | Interjection: Eh<br>Genre: drama |
| 4 | "result": {<br>　"args": {<br>　　"hit": "20"<br>　},<br>　"status": "ok"<br>} | "tts": {<br>　"text": "20 programs have been found."<br>} | Search result | Number of hits: 20 |
| 5 | "dialogue": {<br>　"text": "Play AAA"<br>　"screen":"result.search"<br>} | "command": {<br>　"action": "program.play",<br>　"args": {<br>　　"keyword": "AAA"<br>　}<br>} | Play | Keyword: AAA |
| 6 | "dialogue": {<br>　"text": "I want to watch BBB"<br>　"screen":"OA"<br>} | "command": {<br>　"action":"program.search",<br>　"args": {<br>　　"keyword": "BBB"<br>　}<br>} | Search | Keyword: BBB |

| Relation_id | User_name | Subject | Predicate | Object |
|---|---|---|---|---|
| 1 | main | AAA | isProgramOf | Domestic drama |
| 2 | main | Domestic drama | subClassOf | Drama |

F I G. 7A

| Relation_id | User_name | Subject | Predicate | Object |
|---|---|---|---|---|
| 1 | main | AAA | isProgramOf | Domestic drama |
| 2 | main | Domestic drama | subClassOf | Drama |
| 3 | hanako | Suspense drama | subClassOf | Drama |
| 4 | hanako | Suspense drama | subClassOf | Domestic drama |
| 5 | hanako | AAA | isProgramOf | Suspense drama |

CLASSIFICATION APPARATUS AND CLASSIFICATION METHOD

CROSS-REFERENCE TO RELATED APPLICATIONS

This application is a Continuation Application of PCT Application No. PCT/JP2015/058324, filed Mar. 19, 2015, the entire contents of which are incorporated herein by reference.

FIELD

Embodiments described herein relate generally to a classification apparatus and a classification method.

BACKGROUND

An automatic interactive system is known which performs searches such as television program searches or music searches in response to users' speeches. In search service, data classification is generally performed by a service provider. Thus, when a search is performed according to a classification specified by the user, the user's desired search result may fail to be obtained. For example, no data may be hit. In the search service, the data classification has been desired to be automatically customized for the user.

DETAILED DESCRIPTION

According to one embodiment, a classification apparatus capable of accessing a dialogue log storage which stores dialogue logs for dialogues between a user and an interactive system includes a target log extraction unit and a classification relation generator. The target log extraction unit extracts a set of dialogue logs for one of the dialogues stored in the dialogue log storage, the dialogue including a first speech and a second speech of the user, the second speech following the first speech, the set of dialogue logs including first information indicative of a first classification used for a first search performed by the interactive system based on the first speech, second information indicative of a failure in the first search, and third information indicative of data acquired as a result of a second search performed by the interactive system based on the second speech. The classification relation generator generates a classification relation in which the first classification is associated with the data.

Hereinafter, embodiments will be described with reference to the drawings. In the embodiments described below, like elements are denoted by like reference numerals, and duplicate descriptions are omitted.

First Embodiment

Figure 1:
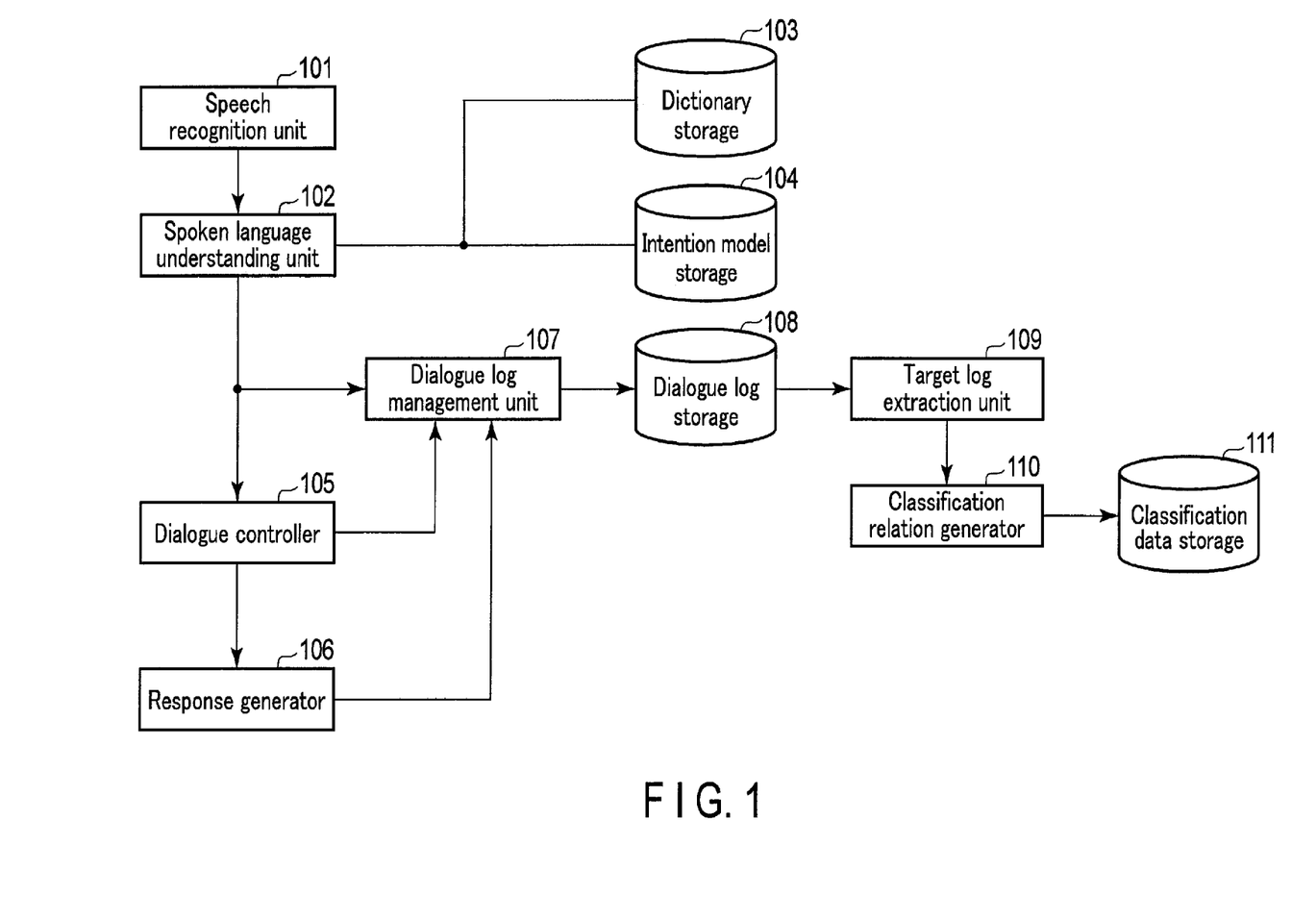
FIG. 1 is a block diagram depicting an interactive system according to a first embodiment.

FIG. 1 schematically depicts an interactive system 100 according to a first embodiment. As depicted in FIG. 1, the interactive system 100 includes a speech recognition unit 101, a spoken language understanding unit 102, a dictionary storage 103, an intention model storage 104, a dialogue controller 105, a response generator 106, a dialogue log management unit 107, a dialogue log storage 108, a target log extraction unit 109, a classification relation generator 110, and a classification data storage 111. A part including the target log extraction unit 109 and the classification relation generator 110 may be referred to as a classification apparatus.

In the present embodiment, the interactive system 100 is implemented in a server which can communicate with a client (user equipment) via a network such as the Internet. The client is, for example, a terminal device such as a smartphone or a television. In the present embodiment, speech signals may be exchanged between the interactive system 100 and the client. For example, a voice (speech) given by the user is converted into a speech signal by a microphone provided in the client, and the speech signal is transmitted to the interactive system 100. A part or all of the interactive system 100 may be implemented in the client.

The speech recognition unit 101 performs speech recognition on the user's speech to generate a natural language text (hereinafter simply referred to as a text) corresponding to the speech.

The spoken language understanding unit 102 analyzes the text using a dictionary stored in the dictionary storage 103 and an intention model stored in the intention model storage 104 to understand the intention of the speech. For example, the spoken language understanding unit 102 executes a morphological analysis and a semantic class analysis on the text with reference to the dictionary. Then, the text is divided into words, and information such as a semantic class indicative of the meaning of a word is imparted to each of the words. In the dictionary, words are registered in association with information such as semantic classes. Subsequently, the spoken language understanding unit 102 understands the intention of the speech with reference to an intention model using features such as the words and the semantic classes thereof. The intention model is pre-generated from a large number of speech samples by learning using semantic classes, words, and the like as features. The spoken language understanding unit 102 outputs an intention understanding result including the speech (text) and the intention of the speech. A method for intention understanding is not limited to the example described herein.

The dialogue controller 105 performs an action based on the intention understanding result. For example, when the intention of the speech is a search, the dialogue controller 105 searches a database using a classification identified based on the speech and notifies the user of a search result. The response generator 106 generates a response sentence for the user's speech. The response sentence is converted into a speech signal by a speech synthesis technique, and the speech signal is transmitted to the client.

The dialogue log management unit 107 collects information on processing executed by the spoken language understanding unit 102, the dialogue controller 105, and the response generator 106, and stores the information in the dialogue log storage 108. The dialogue log storage 108 stores dialogue logs for dialogues between the user and the interactive system 100.

The target log extraction unit 109 extracts a set of dialogue logs for one of the dialogues stored in the dialogue log storage 108. For example, the set of dialogue logs includes the user's first speech, the user's second speech following the first speech, information indicative of a first classification used for a first search performed by the interactive system 100 based on the first speech, information indicative of a failure in the first search, information indicative of a second classification used for a second search performed by the interactive system 100 based on the second speech, and information indicative of data acquired as a result of the second search.

The classification relation generator 110 classifies data based on the set of dialogue logs extracted by the target log extraction unit 109. In the above-described example, the classification relation generator 110 identifies the first classification used for the first search, the information indicative of a failure in the first search, the second classification used for the second search, and the data acquired as the result of the second search, from the information included in the set of dialogue logs. Then, the classification relation generator 110 generates a classification relation in which the first classification is associated with data and a classification relation indicating that the first classification is a sub-classification of the second classification, and stores the classification relations in the classification data storage 111. Processing for generating classification relations can be executed at any timing. For example, the processing for generating classification relations may be periodically executed or executed when a given number of dialogue logs are added to the dialogue log storage 108 after the last processing.

The interactive system 100 including the above-described elements performs data classification based on dialogue logs for a dialogue with the user. Consequently, the data classification can be customized for the user.

The user's speech may be input in text format using a keyboard or a touch panel and transmitted to the speech system 100. In this case, the speech recognition unit 101 may be removed. Furthermore, the response sentence may be transmitted to the client and displayed to the user without application of speech synthesis.

Next, operations of the speech system 100 will be described.

Figure 2:
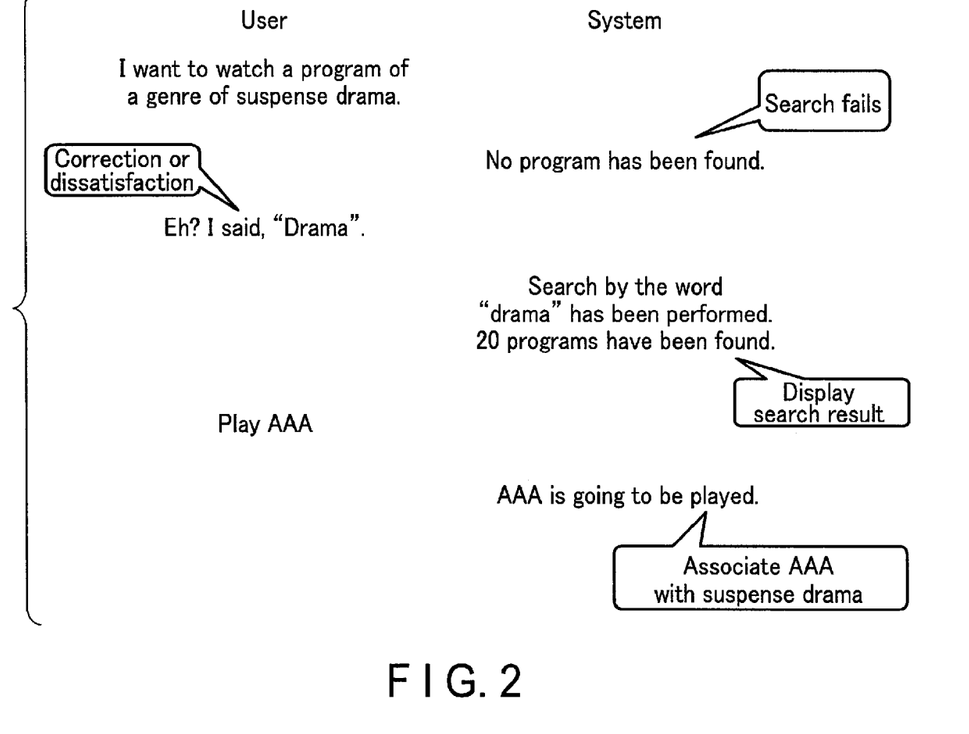
FIG. 2 is a diagram illustrating an example of a dialogue.

FIG. 2 illustrates an example of a dialogue between the user and the interactive system 100. In this example, the client is a television device, and the interactive system 100 acquires the user's desired program from the database and provides the acquired program to the television device.

As depicted in FIG. 2, first, the user says, "I want to watch a program of a genre of suspense drama." Upon receiving the speech, the interactive system 100 performs a search by the words "suspense drama". As a result of the search, no program is found, and the interactive system 100 outputs a response sentence "No program has been found". Upon receiving the response sentence, the user says, "Eh? I said, "Drama"." The interactive system 100 detects that the user has specified another classification and referred to correction and dissatisfaction. The interactive system 100 performs a search by the word "drama". As a result of the search, 20 programs are found, and the interactive system 100 outputs a response sentence "Search by the word "drama" has been performed. 20 programs have been found.", while presenting a list of the programs found. Then, the user looks at the list and says, "Play AAA". Here, AAA represents a specific television program name. Upon receiving the speech, the interactive system 100 outputs a response sentence "AAA is going to be played" and provides data for AAA to the television apparatus.

Based on the user's speech "I want to watch a program of a genre of suspension drama.", the spoken language understanding unit 102 detects that the user has specified a classification "suspense drama". Moreover, based on the user's speech "Eh? I said, "Drama"", the spoken language understanding unit 102 detects that the user has specified a classification "drama", which is different from the last classification mentioned by the user. Since the search by the classification "suspense drama" has failed but the search by the classification "drama" has succeeded, the classification "suspense drama" is determined to have a close relation with the classification "drama". Then, the program "AAA" is associated with "suspense drama".

Furthermore, when the first search results in no hit and another search is performed, the user generally specifies a classification higher than the classification specified for the first search. Thus, "suspense drama" is determined to be a sub-classification of "drama". "Suspense drama" is associated with "dram" such that "suspense drama" is a sub-classification of "drama".

Figure 3:
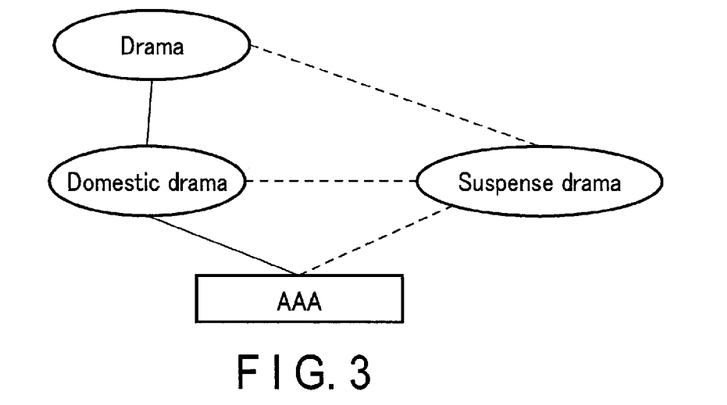
FIG. 3 is a diagram illustrating classification relations generated based on the dialogue illustrated in FIG. 2.

FIG. 3 illustrates classification relations generated based on the dialogue illustrated in FIG. 2. In the example illustrated in FIG. 3, initially, "domestic drama" belongs to a sub-classification of "drama", and the program "AAA" is associated with "drama" and "domestic drama", as depicted by solid lines. After classification is performed based on the dialogue illustrated in FIG. 2, the program "AAA" is also associated with "suspense drama", and "suspense drama" is determined to be a sub-classification of "drama", as depicted by dashed lines.

Figure 4:
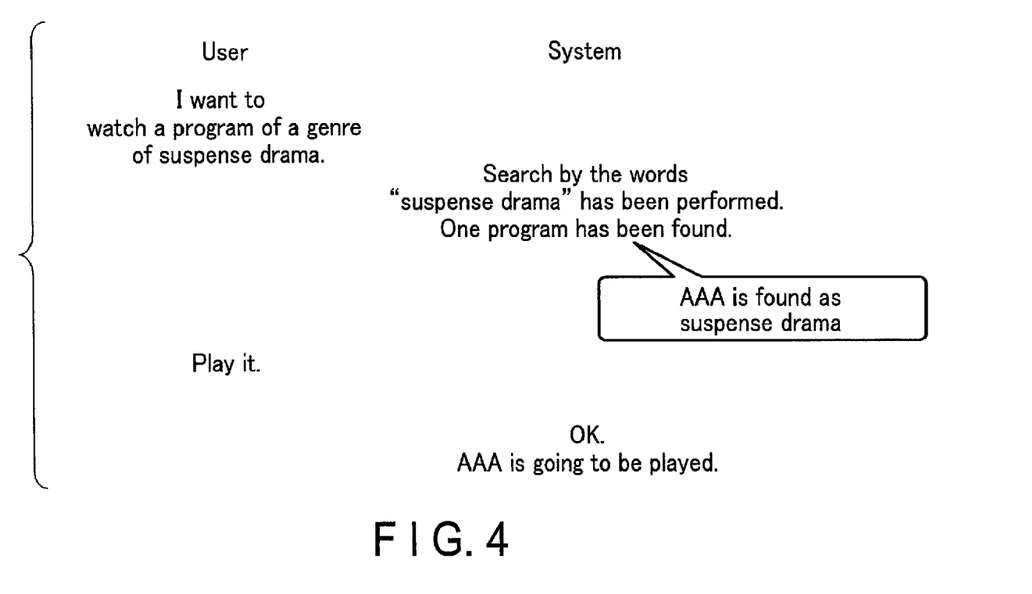
FIG. 4 is a diagram illustrating an example of a dialogue following classification based on the dialogue illustrated in FIG. 2.

FIG. 4 illustrates an example of a dialogue between the user and the interactive system 100 after the classification performed based on the dialogue illustrated in FIG. 2. As depicted in FIG. 4, first, the user says, "I want to watch a program of a genre of suspense drama." Upon receiving the speech, the interactive system 100 performs a search by the words "suspense drama". Since "AAA" is associated with "suspense drama", "AAA" is found as a result of the search. The interactive system 100 outputs a response sentence "Search by the words "suspense drama" has been performed. One program has been found." Upon receiving the response sentence, the user says, "Play it.". Upon receiving the speech, the interactive system 100 outputs a response sentence "I see. AAA is going to be played.", and presents data for "AAA" to the television device.

After classification is performed based on the dialogue illustrated in FIG. 2, a search by the classification "suspense drama" results in a hit of the program "AAA". Classification accuracy can be enhanced by performing data classification based on the dialogue logs for the dialogue between the user and the interactive system 100.

Figure 5:
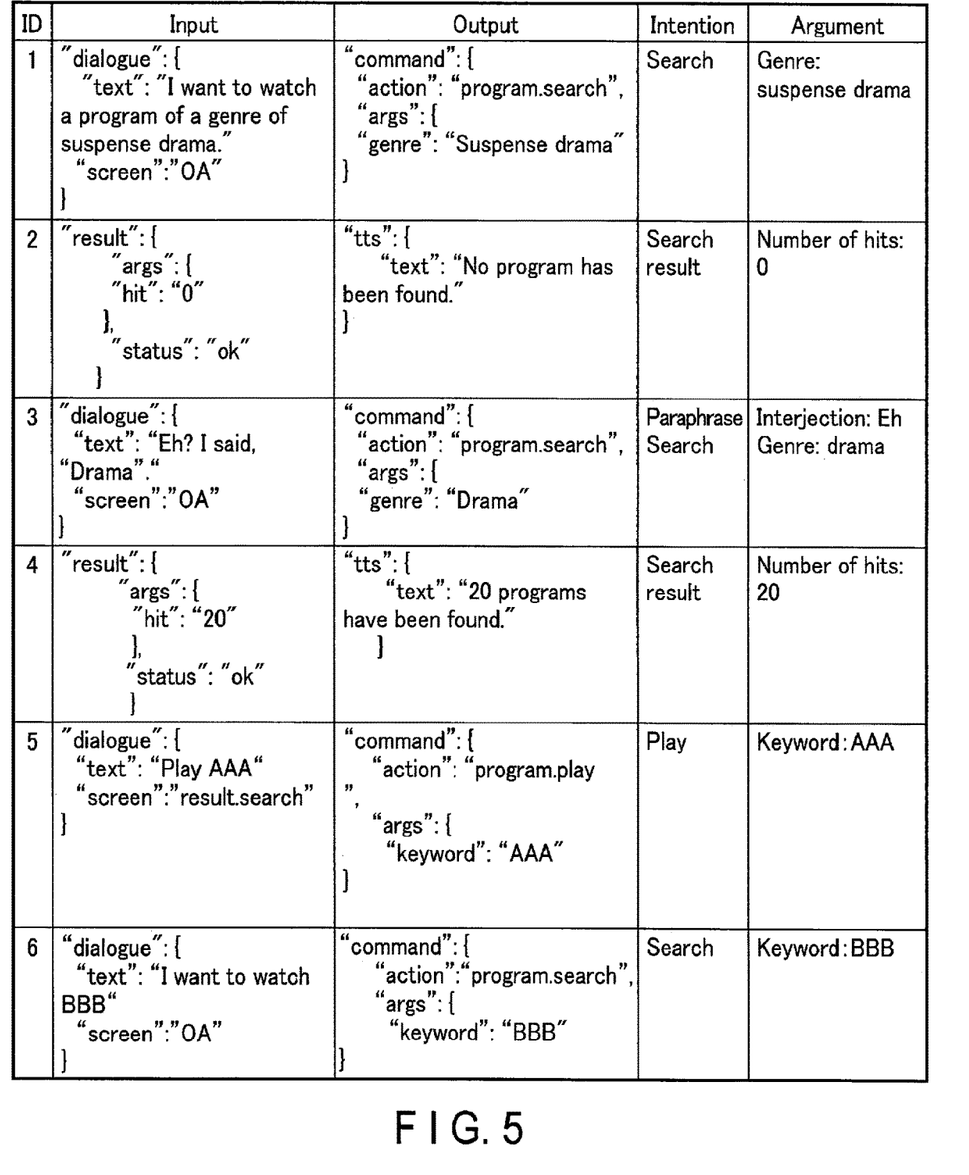
FIG. 5 is a diagram illustrating an example of dialogue logs stored in a dialogue log storage illustrated in FIG. 1.

FIG. 5 illustrates an example of dialogue logs stored in the dialogue log storage. As illustrated in FIG. 5, each dialogue log is separately recorded in an ID field, an Input field, an Output field, an Intention field, and an Argument field. The ID field stores identification information allowing each log to be uniquely identified. The Input field stores information on the user's speech, the status of the client (in this example, a television), the result of an action by the client, and the like. The Output field stores information such as an action command for the client, and a message to the user. In the Input field and the Output field, the information is structured in JSON format. The JSON format is an example of a format for structurization, and the information may be described in another format. The Intention field stores the intention output by the spoken language understanding unit 102. The Argument field stores an argument associated with the intention output by the spoken language understanding unit 102. The argument is, for example, a set of a semantic class and a keyword.

The logs with IDs of 1 to 5 correspond to the dialog illustrated in FIG. 2. The log with an ID of 6 corresponds to a dialogue following the dialogue illustrated in FIG. 2.

The Input field will be described. dialogue.text represents the user's speech. For ID=1, the user's speech is "I want to watch a program of a genre of suspense drama" described in dialogue.text. dialogue.screen represents the status of a screen of the client. For ID=1, dialogue.screen is OA, indicating that the client is displaying a program being broadcasted. For ID=5, dialogue.screen is result.search, indicating that the client is displaying a search result. "result" represents the result of an action by the client. A status indicative of a success, a failure, or an error in an action such as a search is described in result.status. The number of hits in the search is described in result.args.hit.

The Input field will be described. "command" represents an action command indicated to the client by the system. The type of the command is described in command.action, and the argument for the command is described in command.args.genre. For ID=1, program.search, indicating that a search for a program is performed, is described in command.action. "Suspense drama" is described in command.args.genre. "tts" is indicative of a response sentence from the system to the user. For ID=2, "No program has been found." is described in tts.text.

For simplification of description, the dialogue log does not include a time-of-day field or a user information field. The dialogue log includes the time-of-day field and the user information field to allow events to be time-sequentially identified for each user using the time of day, the user ID, and the like. The user ID is not needed when, for example, the interactive system is used by one user.

Figure 6:
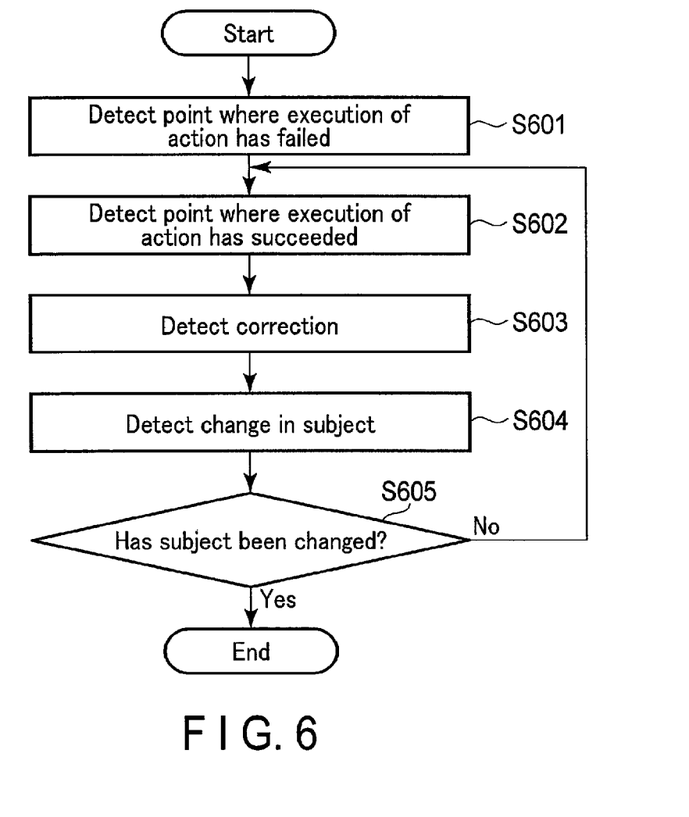
FIG. 6 is a flowchart illustrating an example procedure for log extraction processing by a target log extraction unit illustrated in FIG. 1.

FIG. 6 illustrates an example procedure for log extraction processing by the target log extraction unit 109. In step S601 in FIG. 6, the target log extraction unit 109 detects information indicative of a point where an action (for example, search) has failed, in the dialogue logs stored in the dialogue log storage 108. For example, the target log extraction unit 109 detects a log with result.args.hit=0 or result.status=ok. The target log extraction unit 109 extracts an action command (search expression) which is a source of a search result from the Output filed of the log immediately before the detected log to check whether "genre" is used in the action command. When "genre" is used in the action command, the target log extraction unit 109 determines the log to be a start position for target logs. In the example in FIG. 5, the log with ID=2 is detected, and the action command is extracted from the Output field with ID=1. Since "genre" is used in the action command, the start position for the target logs is determined to be ID=1.

In step S602, the target log extraction unit 109 detects information indicative of a point where execution of the action (search) has succeeded, in the dialogue logs following a failure in the execution of the action. For example, the target log extraction unit 109 detects a log with result.args.hit>0 and result.status=ok. In the example in FIG. 5, the log with ID=4 is detected. The target log extraction unit 109 acquires the action command which is a source of the action result with ID=4, from the Output field with ID=3.

In step S603, the target log extraction unit 109 detects a log with a paraphrase stored in the Intention field. In the example in FIG. 5, the log with ID=3 is detected. The speech with ID=3 is determined to be a paraphrase of the speech with ID=1.

In step S604, the target log extraction unit 109 detects a change in subject. For example, in the log (ID=5) immediately after the action success log detected in step S602, dialogue.screen is result.search and command.action is program.play. Thus, the target log extraction unit 109 detects that the log with ID=5 is associated with the log with ID=4. Furthermore, when command.args.keyword with ID=5 is "AAA" and the action result with ID=3 includes "AAA", the target log extraction unit 109 considers a search condition with ID=3 to be associated with the action with ID=5. input.screen with ID=6 is OA, "BBB" in command.args.keyword is not a classification, and the intention is not "paraphrase", "correction", or the like. Thus, the target log extraction unit 109 detects that the subject has changed at this point (step S605). Here, the "BBB" represents a specific television program name. The target log extraction unit 109 narrows down the target logs to ID=1 to ID=5 and ends the processing.

As described above, the target log extraction unit 109 extracts the set of dialogue logs used to customize the data classification.

Figure 7A:
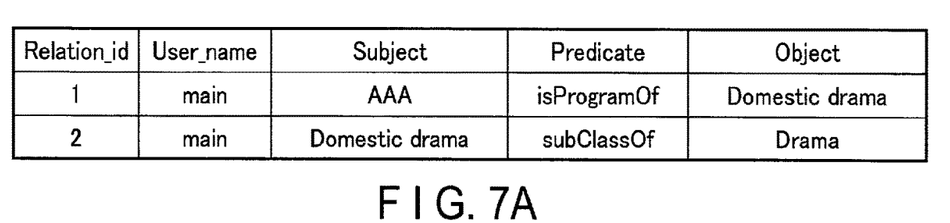
FIG. 7A is a diagram illustrating an example of classification data stored in a classification data storage illustrated in FIG. 1.
Figure 7B:
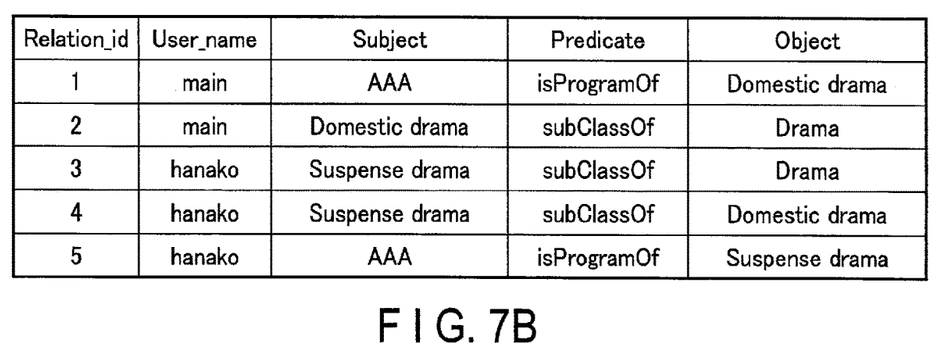
FIG. 7B is a diagram illustrating an example of classification data stored in the classification data storage illustrated in FIG. 1 after classification performed based on the dialogue illustrated in FIG. 2.

The classification relation generator 110 generates classification relations from the set of dialogue logs extracted by the target log extraction unit 109 and stores the classification relations in the classification data storage 111. FIG. 7A and FIG. 7B illustrate an example format of classifications stored in the classification data storage 111. relation_id is indicative of an ID allowing a relation to be identified, and user_name is indicative of a user who has created the relation. In the examples illustrated in FIG. 7A and FIG. 7B, "main" indicates that the relation has previously been created by the system, and "hanako" is the name of a user who is engaged in the dialog. "subject", "predicate", and "object" have the respective literal meanings, and a set of the three fields represents a relation between classifications.

"AAA" is determined to be a program of a "drama" genre based on command.args.genre with ID=3 and command.args.keyword with ID=5 extracted by the target log extraction unit 109, and command.args.genre with ID=1 and command.args.genre with ID=3 are in a paraphrase relation. Thus, the classification relation generator 110 creates a relation in which "suspense drama" is a sub-classification of "drama" as illustrated at relation_id=3 in FIG. 7B. Here, the user is assumed to perform a search with the most detailed classification specified, and a classification relation in the lowest layer is created. Specifically, the classification relation generator 110 considers "suspense drama" to be a sub-classification of a classification belonging to the lowest layer of "drama". For example, the classification relation generator 110 generates a classification relation in which "suspense drama" is a sub-classification of "domestic drama" as illustrated at relation_id=4 in FIG. 7B. Finally, the classification relation generator 110 generates a classification relation in which "AAA" is a program of a "suspense drama" genre in the lowest layer classification. After the classification is customized by the classification relation generator 110, the interactive system 100, when performing a search based on a user's speech, references the classification relation (classification data) created for the user. The classification data may be managed by a server on a cloud in a unified manner or by the client.

In the present embodiment, from the dialogue log storage 108, a set of dialogue logs for one dialogue is extracted which includes information indicative of a first classification used for a first search performed by the interactive system 100 based on the user's first speech, information indicative of a failure in the first search, and information indicative of data acquired as the result of the second search performed by the interactive system 100 based on the user's second speech following the first speech, and a classification relation is generated in which the first classification is associated with the data, as described above. Consequently, the data classification can be customized for the user.

Second Embodiment

Figure 8:
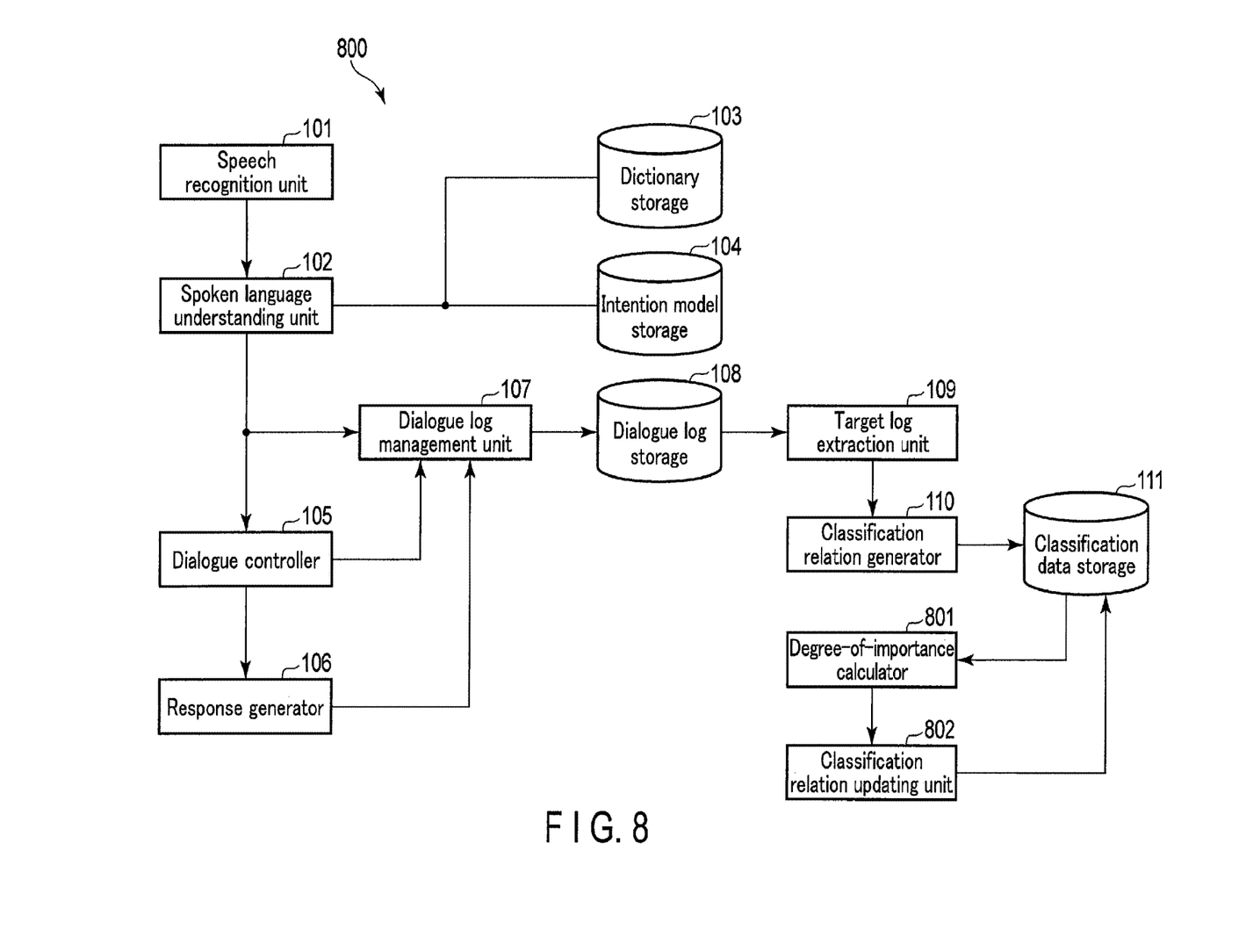
FIG. 8 is a block diagram depicting an interactive system according to a third embodiment.

FIG. 8 schematically depicts an interactive system 800 according to a second embodiment. In addition to the elements of the interactive system 100 depicted in FIG. 1, the interactive system 800 depicted in FIG. 8 includes a degree-of-importance calculator 801 and a classification relation updating unit 802. In the present embodiment, a plurality of users utilizes the interactive system 800, and the classification data storage 111 manages shared classification data generated based on the users' classification data.

The degree-of-importance calculator 801 calculates the degree of importance of a classification relation based on at least one of the number of users, a classification relation usage frequency and a search result usage frequency. The number of users is indicative of the number of users having a calculation target classification relation. The classification relation usage frequency is indicative of the frequency at which, for all the users, the calculation target classification relation has been utilized for a search. The search result usage frequency is indicative of the frequency at which, for all the users, the result of the search using the calculation target classification relation has been utilized. For example, in an example where the client is a television device, the frequency at which the search result has been utilized corresponds to the number of times at which the program resulting from the search has been played. The classification relation updating unit 802 reflects a classification relation with a degree of importance equal to or higher than a threshold in the shared classification data. Classification update may be performed in real time when classification customization is executed by the user or may be performed at regular time intervals.

Figure 9A:
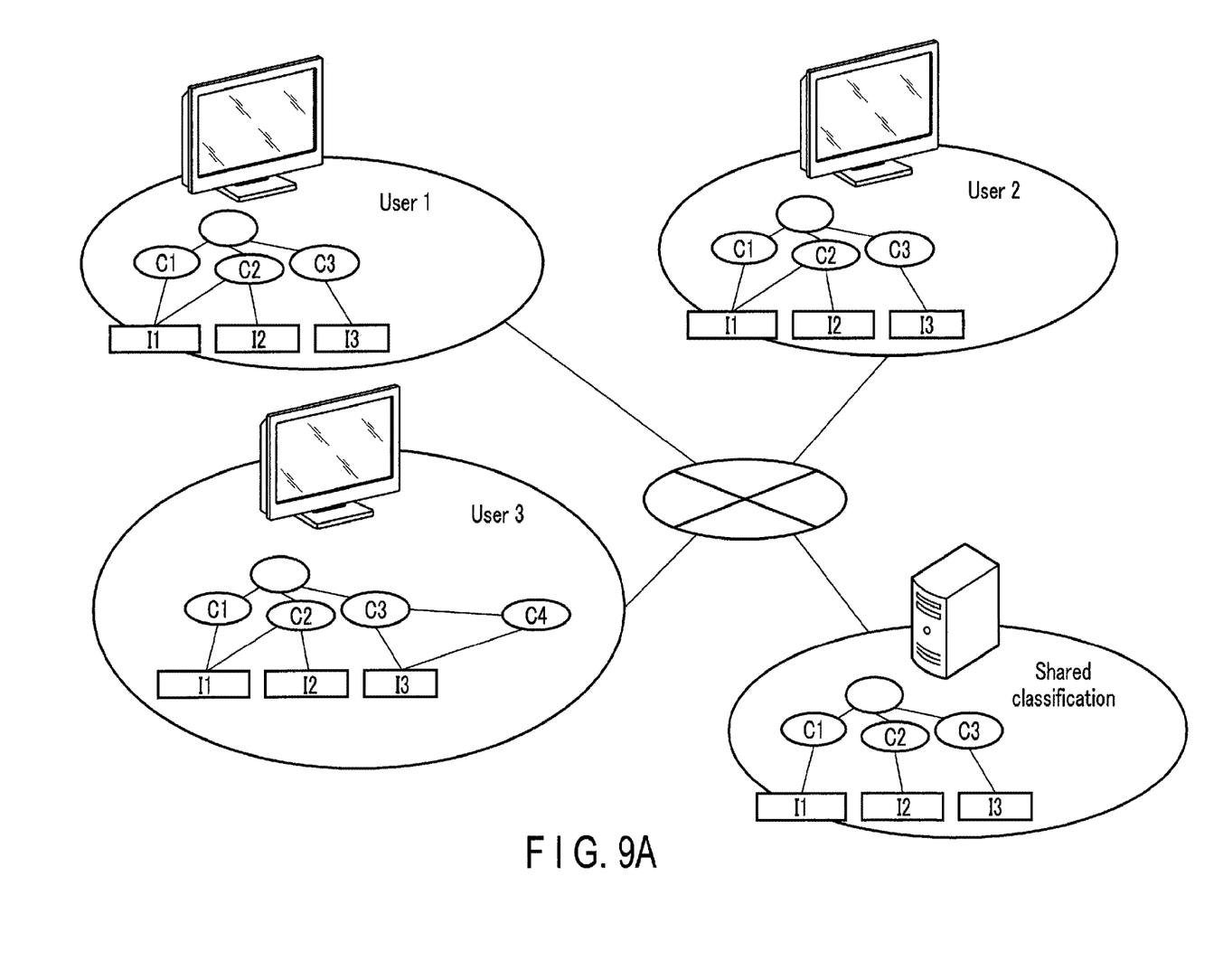
FIG. 9A is a diagram illustrating shared classification data stored in the classification data storage illustrated in FIG. 3.

FIG. 9A schematically illustrates a state where classification customization has been executed for each of users 1, 2, 3. The degree-of-importance calculator 801 calculates the degree of importance for a classification relation, for example, in accordance with the following equation.

The degree of importance=the number of users+classification relation usage frequency+search result usage frequency The degree of importance of the classification relation is calculated in the state illustrated in FIG. 9A. Here, for simplification of description, all the classification relation usage frequencies are assumed to be 1, and all the search result usage frequencies are assumed to be 1.

The degree of importance of a classification relation in which a program I1 belongs to a classification C2=3+1+1=5

The degree of importance of a classification relation in which the program I1 belongs to a classification C3=1+1+1=3

The degree of importance of a classification relation in which a program I3 belongs to a classification C4=1+1+1=3

The degree of importance of a classification relation in which the classification C4 is a sub-classification of the classification C3=1+1+1=3

Figure 9B:
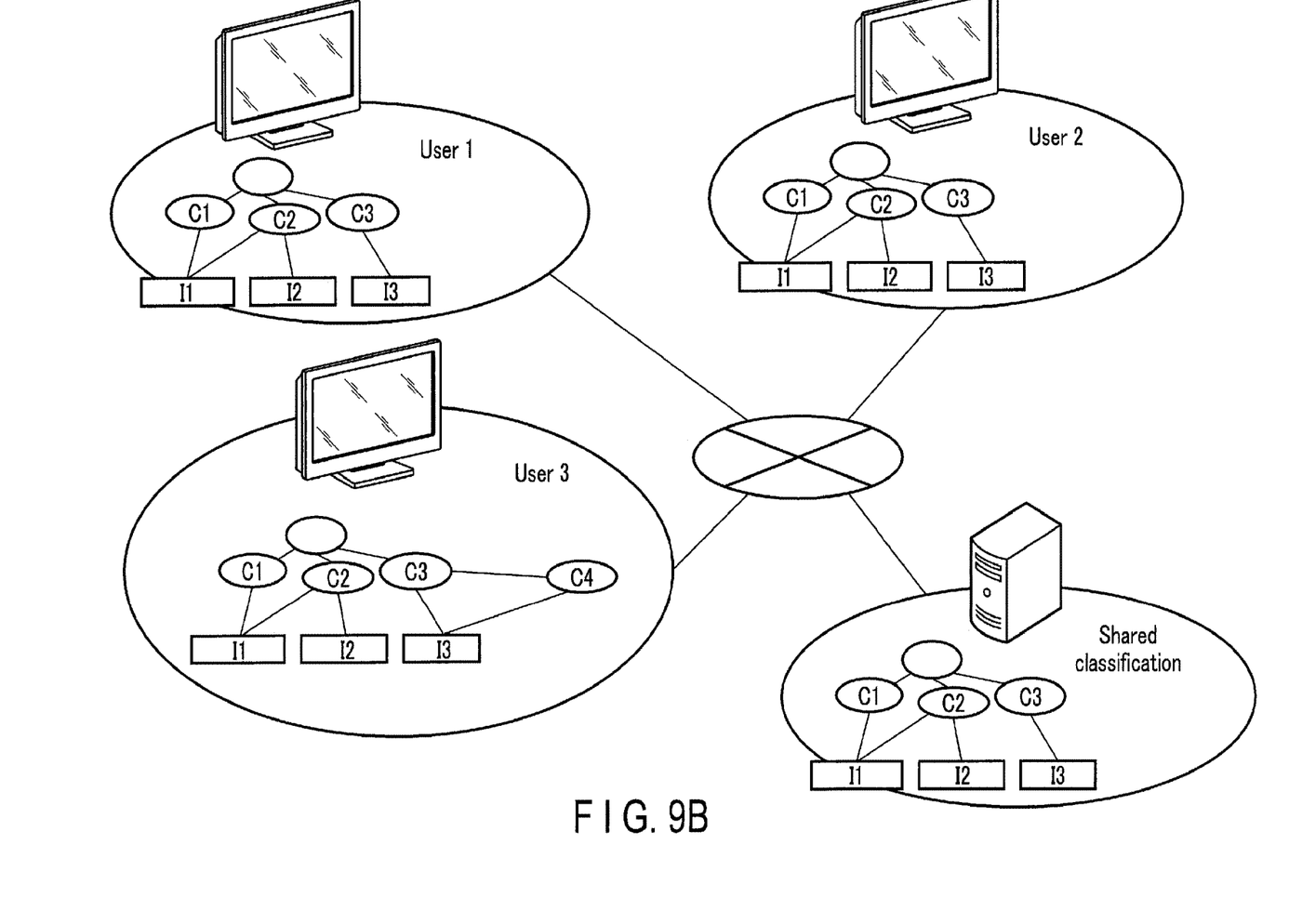
FIG. 9B is a diagram illustrating updated shared classification data stored in the classification data storage illustrated in FIG. 3.

The classification relation updating unit 802 updates the shared classification data using a classification relation with a degree of importance equal to or higher than a threshold. For example, the threshold is 4. In this case, as depicted in FIG. 9B, the classification relation in which the program I1 belongs to the classification C2 is added to the shared classification data. The threshold may be dynamically set based on the number of users using the interactive system 100 or the distribution of the numbers of searches. The shared classification data is shared by all the users. Specifically, the shared classification added to the shared classification data is included in the classification data of all the users. Furthermore, for example, when a new user appears, initial classification data for this user may be the same as the shared classification data.

As described above, in the second embodiment, the degrees of importance of the classification relations are calculated, and the shared classification data is updated using a classification relation with a higher degree of importance. Consequently, all the users can share the classification relation with a higher degree of importance. As a result, classification accuracy is enhanced.

Third Embodiment

Figure 10:
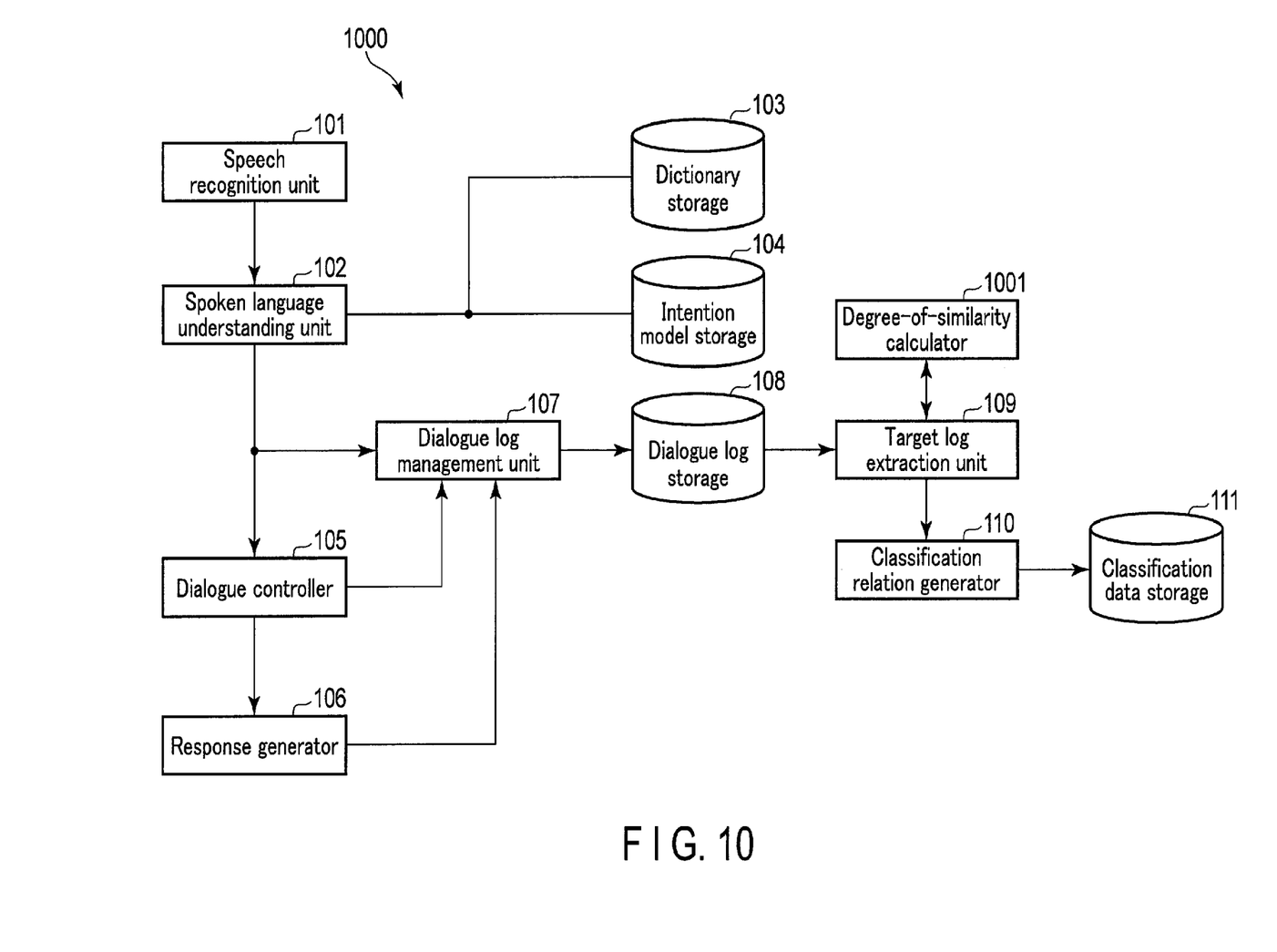
FIG. 10 is a block diagram depicting an interactive system according to a third embodiment.

FIG. 10 schematically depicts an interactive system 1000 according to a third embodiment. In addition to the elements of the interactive system 100 depicted in FIG. 1, the interactive system 1000 depicted in FIG. 10 includes a degree-of-similarity calculator 1001. The degree-of-similarity calculator 1001 calculates the degree of similarity between classifications included in the dialogue logs.

In the first embodiment, a change in subject is determined based on a client status, information indicating that the argument is not a classification, and the absence of correction. The user may refer to an irrelevant classification, and the user may refer to a relevant keyword. Thus, the degree-of-similarity calculator 1001 calculates the degree of similarity between classifications. The target log extraction unit 109 detects a change in subject using the degree of similarity. Consequently, a change in subject can be more accurately detected. Specifically, the degree-of-similarity calculator 1001 calculates the degree of similarity between a classification appearing as a subject in the dialogue logs and the classification of a program included in the programs detected according to a keyword which program has been subjected to processing such as playing or recording. The target log extraction unit 109 then detects a change in subject when the degree of similarity is lower than a threshold.

As a method for calculating the degree of similarity, an existing method may be used. Available methods include, for example, a method of executing calculation using the closeness between paths in graphs illustrating the relations among the classifications as illustrated in FIG. 7A, FIG. 7B, FIG. 9A, and FIG. 9B and a method of extracting keywords from text information describing the contents of programs on the Internet such as an electronic program guide or wikipedia and executing calculation using a vector space model for words.

As described above, in the third embodiment, the degree of similarity between classifications is calculated, and a change in subject is detected using the degree of similarity. Consequently, a change in subject in the dialogue logs can be more accurately detected.

Instructions indicated in the processing procedure indicated in the above-described embodiments can be executed based on a program which is software. Effects similar to those of the interactive system s in the above-described embodiments can be produced by a general-purpose computer system by pre-storing and loading the above-described program. The instructions described in the above-described embodiments are recorded in a magnetic disk (a flexible disk, a hard disk, or the like), an optical disc (CD-ROM, CD-R, CD-RW, DVD-ROM, DVD±R, DVD±RW, or the like), a semiconductor memory, or a similar recording medium as a program that can be executed by a computer. The recording medium may have any storage format so long as a computer or an embedded system can read data from the recording medium. By loading the program from the recording medium and allowing a CPU to execute the instructions described in the program based on the program, the computer can implement operations similar to those of the interactive systems in the above-described embodiments. Of course, when acquiring or loading the program, the computer may execute the acquisition or loading through a network.

A part of the processing for implementing the present embodiments may be executed by an OS (Operating System) running on the computer based on the instructions in the program installed in the computer or the embedded system via the recording medium, MW (Middleware) such as database management software or a network, or the like.

Moreover, examples of the recording medium in the present embodiments are not limited to media independent of the computer or the embedded system but include recording media in which the program transmitted through a LAN, the Internet, or the like is downloaded and stored or temporarily stored.

Furthermore, the present embodiments are not limited to a single recording medium. A case where the processing in the present embodiments is executed via a plurality of media is also embraced by the recording medium in the present embodiments. The medium may have any configuration.

The computer or the embedded system in the present embodiments executes the processes in the present embodiments based on the program stored in the recording medium, and may have any configuration such as a single apparatus such as a personal computer or a microcomputer, or a system of a plurality of apparatuses connected together via a network.

Furthermore, examples of the computer in the present embodiments are not limited to personal computers but include arithmetic processing apparatuses, microcomputers, or the like included in information processing equipment. The computer in the present embodiments is a general term for equipment and apparatuses which can implement the functions of the present embodiments through the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A classification apparatus configured to access a dialogue log memory that stores dialogue logs for dialogues between a user and an interactive system, the classification apparatus comprising:
 circuitry configured to
  extract a set of dialogue logs fir one of the dialogues stored in the dialogue log memory, the dialogue including a first speech and a second speech of the user, the second speech following the first speech, the set of dialogue logs including first information indicative of a first classification used as a search criteria fora first search performed by the interactive system based on the first speech, second information indicative of a failure in the first search, and third information indicative of data acquired as a search result of a second search performed by the interactive system based on the second speech; and
  generate a first classification relation in which the first classification used as the search criteria in the first search is associated with the data acquired in the second search; and
 a classification data memory that stores, for each of a plurality of users, classification data including a classification relation generated by the circuity and which further stores shared classification data shared by the users, wherein the circuitry is further configured to
  calculate a degree of importance of a target classification relation based on a number of users having the target classification relation, a classification relation usage frequency indicative of a frequency at which, for the users, the target classification relation is utilized for a search, and a search result usage frequency indicative of a frequency at which, for the users, a result of the search using the target classification relation is utilized; and
  add the target classification relation to the shared classification data when the degree of importance is equal to or higher than a threshold.

2. The classification apparatus according to claim 1, wherein the set of dialogue logs further includes fourth information indicative of a second classification used as search criteria for the second search, and
 the circuitry is further configured to generate a second classification relation indicating that the first classification is a sub-classification of the second classification.

3. The classification apparatus according to claim 1, wherein the circuitry is further configured to calculate a degree of similarity between classifications included in the dialogue logs, and detect a change in subject based on the degree of similarity.

4. A classification method, comprising:
 extracting, from a dialogue log memory storing dialogue logs for dialogues between a user and an interactive system, a set of dialogue logs for one of the dialogues, the dialogue including a first speech and a second speech of the user, the second speech following the first speech, the set of dialogue logs including first information indicative of a first classification used as a search criteria for a first search performed by the interactive system based on the first speech, second information indicative of a failure in the first search, and third information indicative of data acquired as a search result of a second search performed by the interactive system based on the second speech; and generating a first classification relation in which the first classification used as the search criteria in the first search is associated with the data acquired in the second search wherein the method further comprises storing, in a classification data memory, classification data for each of a plurality of users including a classification relation generated and further storing, in the classification data memory, shared classification data shared by the users;

calculating a degree of importance of a target classification relation based on a number of users having the target classification relation, a classification relation usage frequency indicative of a frequency at which, for the users, the target classification relation is utilized for a search, and a search result usage frequency indicative of a frequency at which, for the users, a result of the search using the target classification relation is utilized; and adding the target classification relation to the shared classification data when the degree of importance is equal to or higher than a threshold.

5. The classification method according to claim 4, wherein the set of dialogue logs further includes fourth information indicative of a second classification used as a search criteria for the second search, and the method further comprises generating a second classification relation indicating that the first classification is a sub-classification of the second classification.

6. The classification method according to claim 4, further comprising calculating a degree of similarity between classifications included in the dialogue logs, wherein the extracting the set of dialogue logs comprises detecting a change in subject based on the degree of similarity.

7. A non-transitory computer readable medium including computer executable instructions, wherein the instructions, when executed by processing circuitry, cause the processing circuitry to perform a method comprising:

extracting, from a dialogue log memory storing dialogue logs for dialogues between a user and an interactive system, a set of dialogue logs for one of the dialogues, the set of dialogue logs including first information indicative of a first classification used as a search criteria for a first search performed by the interactive system based on the user's first speech included in the dialogue, second information indicative of a failure in the first search, and third information indicative of data acquired as a search result of a second search performed by the interactive system based on the user's second speech following the first speech, the second speech being included in the dialogue; and generating a first classification relation in which the first classification used as the search criteria in the first search is associated with the data acquired in the second search, wherein the method further comprises storing, in a classification data memory, classification data for each of a plurality of users including a classification relation generated and further storing, in the classification data memory, shared classification data shared by the users;

calculating a degree of importance of a target classification relation based on a number of users having the target classification relation, a classification relation usage frequency indicative of a frequency at which, for the users, the target classification relation is utilized for a search, and a search result usage frequency indicative of a frequency at which, for the users, a result of the search using the target classification relation is utilized; and adding the target classification relation to the shared classification data when the degree of importance is equal to or higher than a threshold.

8. The non-transitory computer readable medium according to claim 7, wherein the set of dialogue logs further includes fourth information indicative of a second classification used for the second search, and the method further comprises generating a second classification relation indicating that the first classification is a sub-classification of the second classification.

9. The non-transitory computer readable medium according to claim 7, wherein the method further comprises calculating a degree of similarity between classifications included in the dialogue logs, and wherein the extracting the set of dialogue logs comprises detecting a change in subject based on the degree of similarity.

* * * * *